July 30, 1963     W. C. RUTLEDGE     3,099,153
PAPER STRENGTH TESTER
Filed March 31, 1960     5 Sheets-Sheet 1
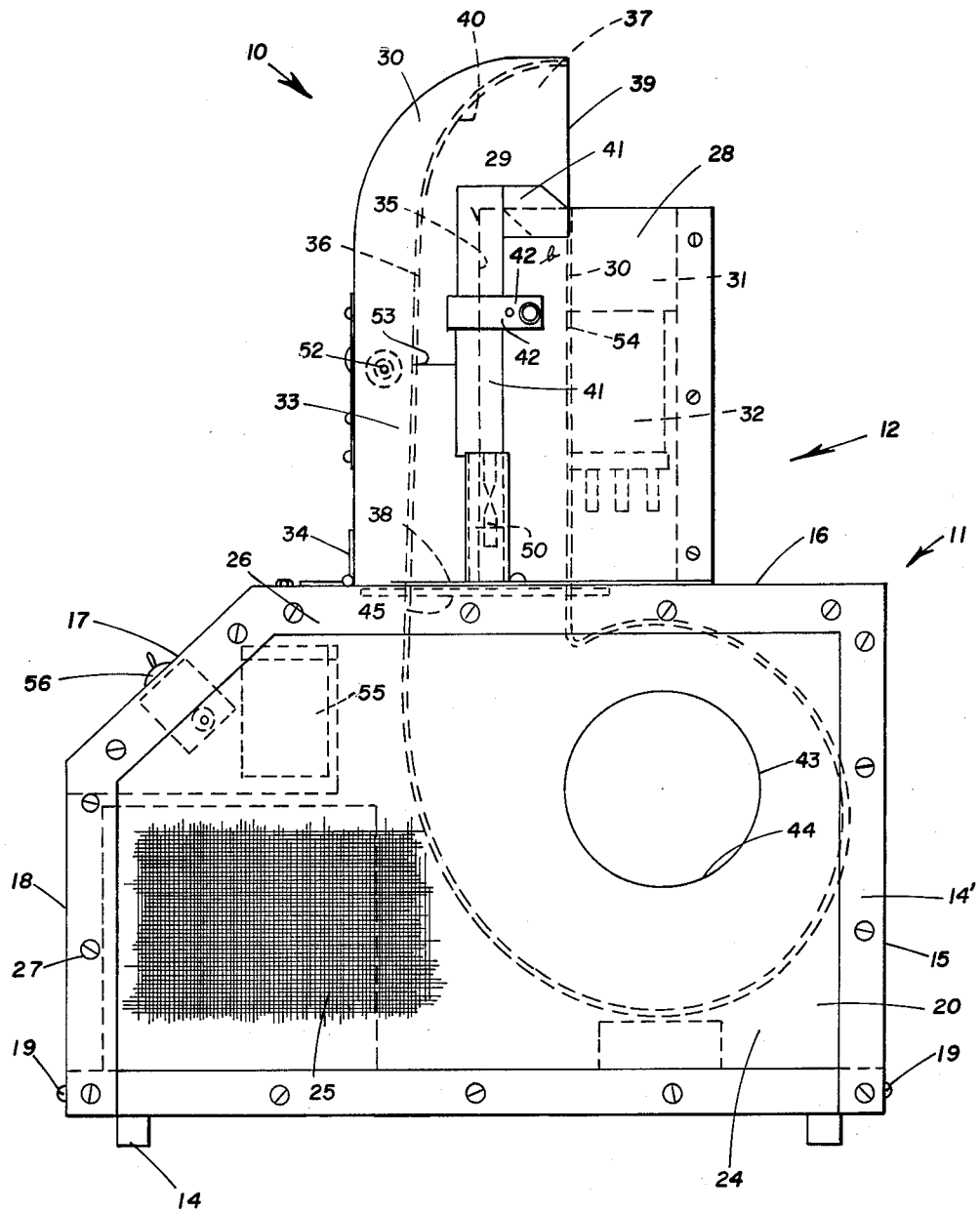
FIG. 1
INVENTOR.
WYMAN C. RUTLEDGE
BY IRVIN V. GLEIM
ATTORNEY

INVENTOR.
WYMAN C. RUTLEDGE
BY. IRVIN V. GLEIM

ATTORNEY

July 30, 1963  W. C. RUTLEDGE  3,099,153
PAPER STRENGTH TESTER
Filed March 31, 1960  5 Sheets-Sheet 3

INVENTOR.
WYMAN C. RUTLEDGE
BY IRVIN V. GLEIM

ATTORNEY

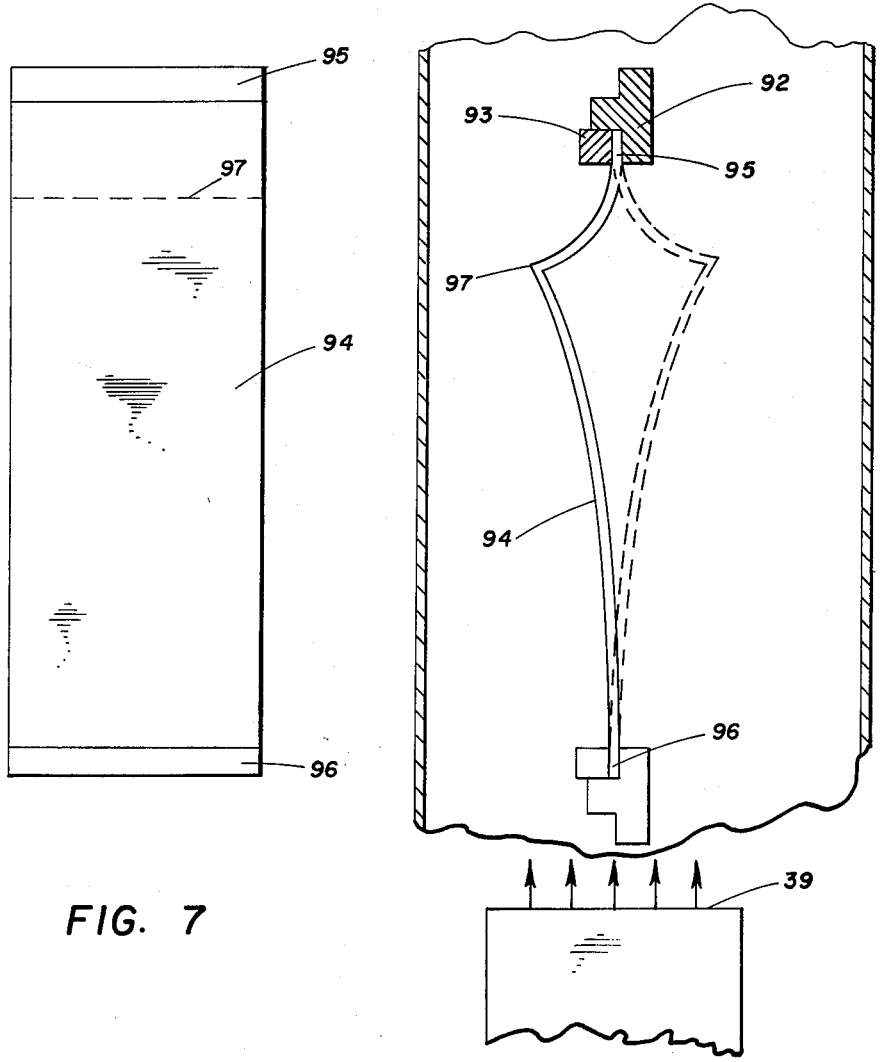

INVENTOR.
WYMAN C. RUTLEDGE
BY IRVIN V. GLEIM
ATTORNEY

United States Patent Office 3,099,153
Patented July 30, 1963

3,099,153
PAPER STRENGTH TESTER
Wyman C. Rutledge, Chillicothe, Ohio, assignor to The Mead Corporation, Dayton, Ohio, a corporation of Ohio
Filed Mar. 31, 1960, Ser. No. 19,039
14 Claims. (Cl. 73—100)

This invention relates to an improved method and apparatus for testing the strength of a paper product or the like, and, more particularly, to a method and apparatus for testing the dynamic strength of a paper product.

It is well known in the art to have business forms and the like printed on a continuous web of paper and have the individual forms separated from each other by rows of perforations whereby the business forms are processed in a continuous manner through various business machines and subsequently separated by tearing along the perforations thereof. However, because of the excess folding, handling and abuse rendered the continuous web of paper and particularly perforated paper, during its business processing, the paper tends to tear, for example, at the perforations thereof unless the paper has desired dynamic strength characteristics.

Until the present invention, no satisfactory means had been provided for testing the strength of a paper product and, particularly, the dynamic strength thereof, whereby it could be determined whether a particular paper product had a sufficient strength to withstand subsequent handling and abuse for its desired use, such as perforated business forms and the like.

The prior known fold strength testers normally comprise two sets of jaws that respectively clamp the paper product on each side of a fold line thereof and are so constructed and arranged that the same continuously fold the product at the fold line until the paper product fails. However, not only do these prior known jaws tend to cut the paper product at the fold line but there is no means to take into consideration the base weight of the paper product as these prior known testers apply a constant tension to the paper product regardless of the base weight thereof. Moreover, such prior known testers are not adapted for testing dynamic strength characteristics of paper.

According to the teachings of this invention, however, an improved method and apparatus is provided wherein the holding means for the sample to be tested does not affect the paper product and the tension applied to the sample varies according to the base weight thereof. In addition, and in accord with this invention, the dynamic strength characteristics of paper can be readily determined.

Accordingly, it is an object of this invention to provide an improved apparatus for testing the strength of a paper product or the like.

Another object is to provide an improved method for testing the strength of a paper product or the like.

A further object of this invention is to provide such apparatus for testing dynamic and fold strength properties of paper which in commercial use is subjected to changing velocities and tensions.

Other objects, uses and advantages of this invention will become apparent upon a reading of the following specification, taken in conjunction with the accompanying drawings wherein:

FIGURE 1 is a side view of the apparatus of this invention;

FIGURE 6 is a view similar to FIGURE 4 and illustrates another method of this invention;

FIGURE 7 is a view similar to FIGURE 5 and illustrates another sample of a paper product to be tested by the method and apparatus of this invention; and, FIGURE 8 is a schematic diagram illustrating the electrical circuit for the apparatus of this invention.

Figure 2:
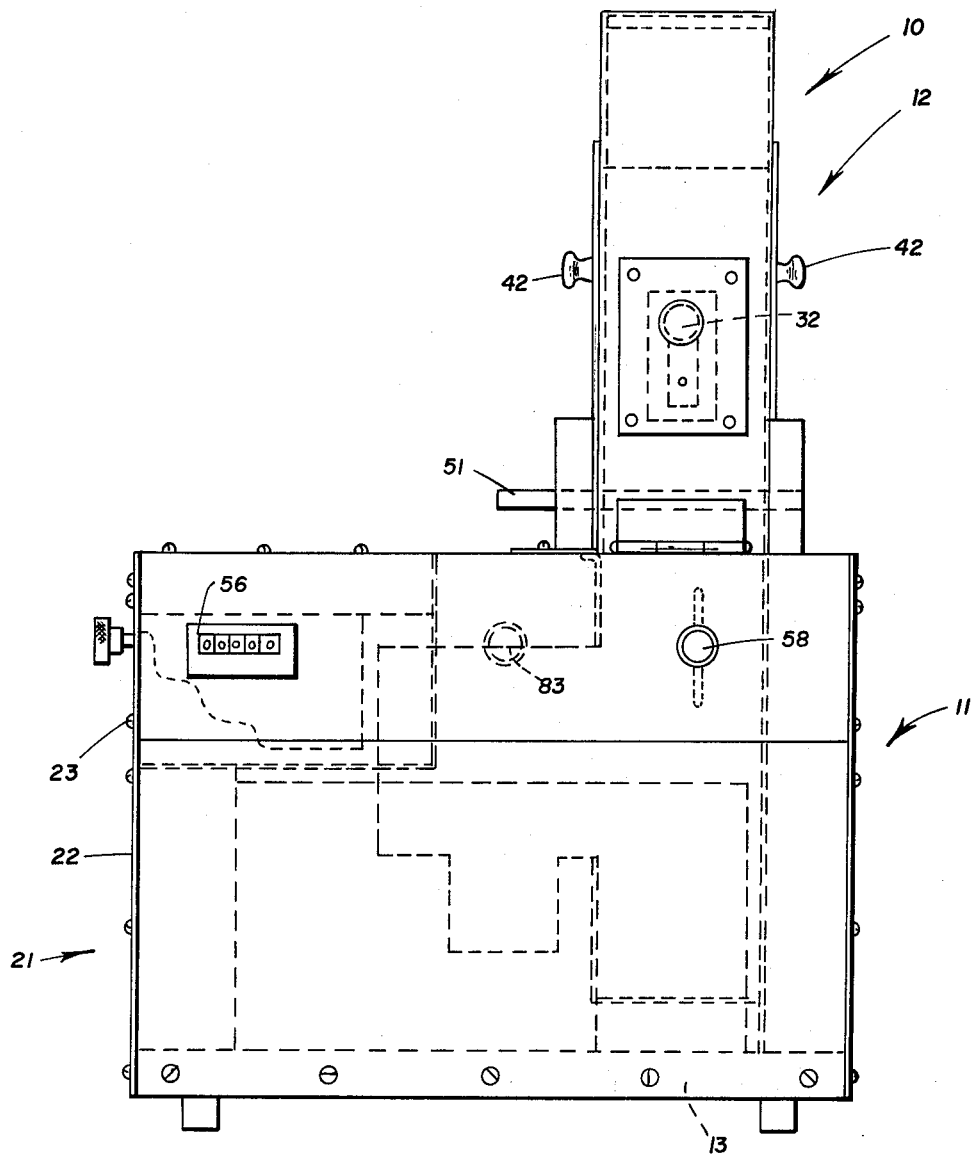
FIGURE 2 is a front view of the apparatus illustrated in FIGURE 1.

The fold strength testing apparatus of this invention is generally indicated by reference numeral 10 in FIGURES 1 and 2 and comprises a base section 11 and a housing section 12.

The base section 11 comprises a base plate 13 supported on suitable legs 14, formed of rubber or the like, and carrying a sheet metal plate 14′ suitably bent to define a back wall 15, a top wall 16, an upper slanting front wall 17 and a lower vertical front wall 18, the front wall 18 and back wall 15 being secured to base plate 13 by screws 19 and defining a compartment 20 therewith. One side 21 of compartment 20 is closed off by a sheet metal plate 22 suitably secured to add edge flanging of plate 14′ by sheet metal screws 23. The other side 24 of compartment 20 is closed off by wire screen 25 secured to edge flanging 26 of plate 14′ by sheet metal screws 27.

Housing section 12 includes a substantially rectangular housing 28 secured to top wall 16 of base section 11, housing 28 having an open end 29 and a baffle plate 30 spaced inwardly from the end 29 thereof and defining a compartment 31 for receiving a suitable light sensing means or photorelay 32 for a purpose hereinafter described.

Housing 33 is hingedly mounted to top wall 16 of base section 11 by a suitable hinge 34 and is adapted to have an open end 35 thereof register with open end 29 of housing 28 when housing 33 is in the position illustrated in FIGURES 1 and 2. An upwardly extending baffle plate 36 is secured inwardly of open end 35 of housing 33 and cooperates with baffle plate 30 of housing 33 and the housings 28 and 33 to define an upwardly extending elongated chamber 37 having an inlet 38 and an outlet 39, the chamber 37 having a decreasing cross-sectional configuration from inlet 38 to outlet 39 thereof and curving at 40 for a purpose hereinafter described.

Flange members 41 are secured to open end 29 of housing 28 and are adapted to telescopically receive the side of housing 33 when housing 33 is in the position illustrated in FIGURE 1.

Figure 3:
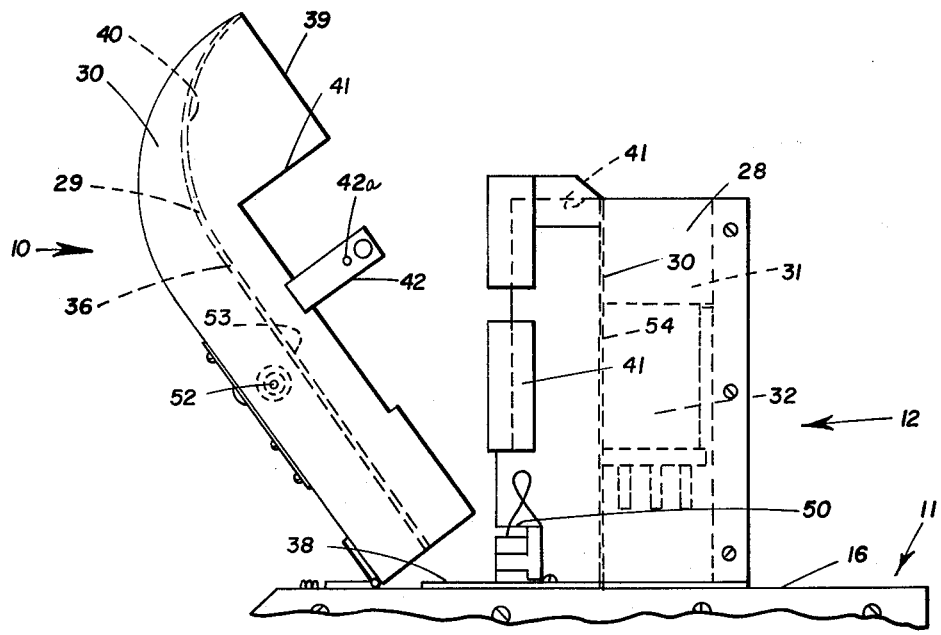
FIGURE 3 is a fragmentary side view of the apparatus of FIGURE 1 and illustrates the same in one of its operating positions.

In order to maintain housing 33 in the position illustrated in FIGURE 1, spring latch members 42 are carried by housing 33 and are normally urged toward the sides of housing 28 whereby pins 42a carried respectively by latch members 42 are received in suitable openings 42b formed respectively in the sides of housing 28 to hold housing 33 in its closed position. When it is desired to open housing 33, latch members 42 are pulled outwardly to release pins 42a from openings 42b and housing 33 is pivoted to the left, as viewed in FIGURE 3, about hinge 34 whereby a sample to be tested can be placed in or removed from compartment 37.

A suitable air-blower 43 is disposed and supported within compartment 20 of base section 11 and has an inlet 44 and outlet 45, the outlet 45 of blower 43 being interconnected to inlet 38 of chamber 37 by a suitable aperture formed in top wall 16 of base section 11.

When blower 43 is operated, it draws air through screen 25 into its inlet 44 and forces the same out through its outlet 45 and, thus, through chamber 37 to its outlet 39.

Figures 4, 5:
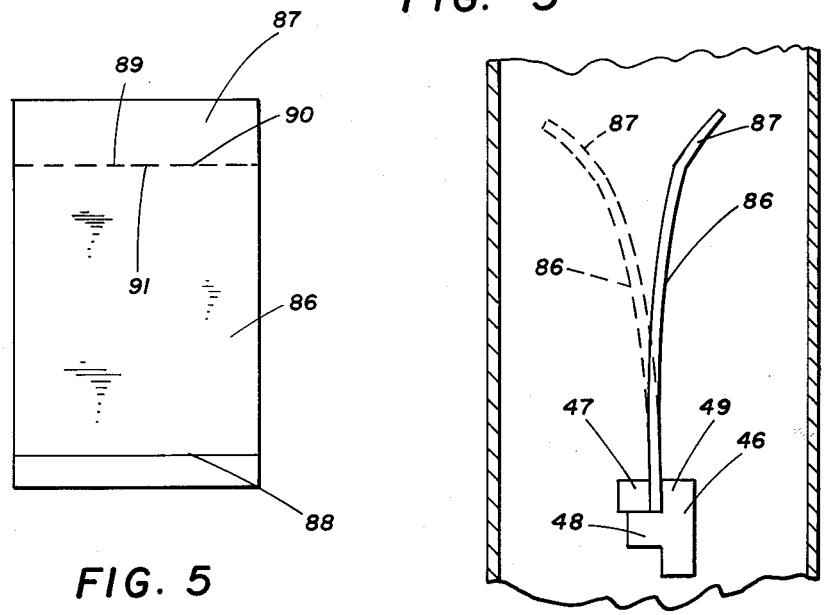
FIGURE 4 is a fragmentary, broken away view of a portion of the apparatus illustrated in FIGURE 1 and illustrates one method of this invention.
FIGURE 5 is a plan view of a sample of a paper product to be tested by this apparatus and method.

As illustrated in FIGURE 4, a pair of holding means or jaws 46 and 47 are carried by apparatus 10 and are disposed transversely across compartment 37. Jaw 46 has an outwardly extending flange 48 and an upwardly extending flange 49, the jaw 46 being held fixed to housing 28 in suitable slots in the sides thereof. Jaw 47 is movable and is adapted to cooperate with flanges 48 and 49 of jaw 46 to secure a paper product therebetween, movable jaw 47 being urged toward flange 49 by suitable springs 50 carried by housing 28.

If desired, mating vertical surfaces of jaws 46 and 47 can be provided with gripping means, such as being knurled, or covered with abrasive means, such as emery cloth or the like, to facilitate their holding function.

In order to open jaws 46 and 47 to place a paper product therebetween, an extension or handle portion 51, FIGURE 2, of jaw 47 is grasped and pulled forwardly whereby jaw 47 is moved away from jaw 46 in opposition to the force of springs 50 tending to maintain jaws 46 and 47 in abutting relation. After the product has been placed between jaws 46 and 47, handle 51 is released and springs 50 move jaw 47 toward jaw 46 to clamp the paper product therebetween.

A bulb or light source 52 is carried by housing 33 and is adapted to be energized when blower 43 is operating. Light from this source 52 is adapted to enter chamber 37 through an aperture 53 formed in the baffle 40 and pass through chamber 37 and a suitable aperture 54 formed in the baffle 30 to photorelay 32.

However, when a paper product to be tested is disposed in chamber 37 in a manner hereinafter described, the paper product normally prevents light from light source 52 reaching the photorelay 32 until after the same has failed and separated at the fold line thereof whereby the photorelay 32 stops a timer 55 carried by base section 11 and interconnected to a counter 56 which measures the time in seconds that it takes to cause the paper product to fail.

Figure 8:
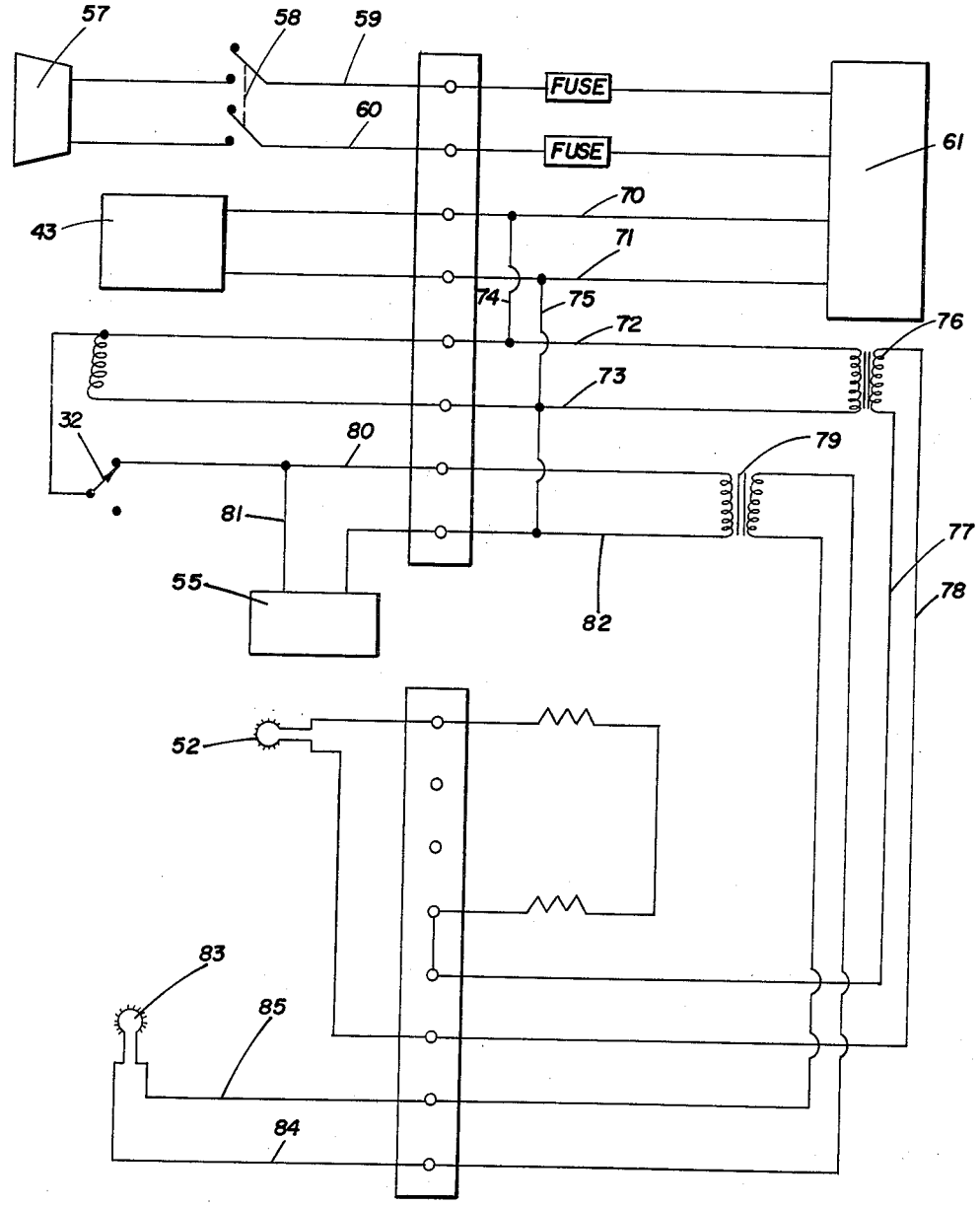

As illustrated in FIGURE 8, suitable electric current is fed from source 57 to an on-off switch 58 mounted on front wall 17 of apparatus 10. When switch 58 is closed, current is supplied by leads 59 and 60 to a voltage regulator 61 which, in turn, supplies the electricity by leads 70 and 71 to blower 43 whereby voltage regulator 61 causes blower 43 to operate at a constant speed and force a constant volume of air through chamber 37 of apparatus 10.

Leads 70 and 71 leading to blower 43 are, in turn, interconnected to leads 72 and 73 by leads 74 and 75, the leads 72 and 73 leading to photorelay 32 at one end thereof and to transformer 76 at the other end thereof. Transformer 76 is, in turn, interconnected to blower light 52 by leads 77 and 78.

Photorelay 32 is interconnected to one side of transformer 79 by a lead 80, the lead 80 also being interconnected to one side of timer 55 by a lead 81. The other side of transformer 79 is interconnected to the other side of timer 55 by a lead 82 which is also interconnected to lead 71 by lead 75. Thus, when photorelay 32 is not actuated upon by light from light source 52 reaching the photorelay, the timer 55 is operated. However, when light from light source 52 reaches photorelay 32, the photorelay 32 is actuated and thus disconnects lead 72 from lead 80 whereby timer 55 is stopped. Similarly, when photorelay 32 is actuated by light source 52, transformer 79 ceases to function and timer light 83 is de-energized, timer light 83 being interconnected to transformer 79 by leads 84 and 85.

The operation of apparatus 10 will now be described. As illustrated in FIGURE 4, a sample paper product 86, such as a piece of paper, is taken from stock which is to have the strength thereof measured, sample 86 having a pair of opposed ends 87 and 88 and being adapted to be folded upon a line 89.

In the embodiment illustrated, the paper product 86 is adapted to be folded upon a perforated line 89 comprising eight perforations 90 of approximately 0.187 inch width and hinges 91 of approximately 0.045 inch width.

Sample 86 is first maintained under certain controlled conditions in order that the same can be compared to certain standards. For example the sample may be aged several hours at 50% relative humidity and 75° F.

Thereafter, paper product 86 is placed in chamber 37 by opening housing 33 in the manner previously described and end 88 thereof is secured in jaws 46 and 47 by pulling outwardly on handle 51 of jaw 47 whereby end 88 of product 86 can be inserted between jaws 46 and 47. By releasing handle 51 of jaw 47, springs 50 cause jaws 47 to firmly clamp the product 86 against jaw 46.

As previously stated, paper product 86 is of sufficient length that light from source 52 is prevented from reaching photorelay 32.

When machine 10 is turned on by closing switch 58, blower 43 begins to operate and simultaneously timer 55 begins to run causing counter 56 to count the seconds that timer 55 runs. Also, blower light 52 and timer light 83 are energized.

As air is forced through chamber 37 to outlet 39 thereof by blower 43, the moving air causes paper product 86 to vibrate in the manner illustrated in FIGURE 4 whereby product 86 alternately folds and unfolds at line 89 thereof. When paper product 86 fails at line 89, the end 87 breaks away at line 89 and permits light from light source 52 to reach photorelay 32 whereby photorelay 32 stops timer 55 and timer light 83 by disconnecting lead 72 from lead 80. Thus, counter 56 stops and indicates the number of seconds it took for paper product 86 to fail. By comparing the time it took paper product 86 to fail with a standard scale for paper products having the same base weight as product 86 it could be determined what the strength of paper product 86 is.

It is to be understood that although paper product 86 has been perforated at 89, the apparatus 10 can measure the fold strength of a paper product which strength is a measure of the dynamic tensile and fold characteristics of the paper product. In the event that the paper product to be tested for such strength characteristics is of a weight which substantially prohibits vibration normally resulting from the upward flow of air induced by the practice of this invention, it has been found that such strength characteristics can nevertheless be determined by either sufficiently increasing the velocity of the upward flow of air or by initially folding the paper product along a line where failure might be expected. In certain instances, as for example where the product to be tested is of relatively high caliper, it may be necessary to increase the velocity of the upward flow of air and concomitantly fold the product along a line of expected failure.

In the embodiment illustrated in FIGURES 6 and 7 of the drawings, another set of jaws 92 and 93 formed in the same manner as jaws 46 and 47 previously described are disposed vertically upwardly from jaws 46 and 47. In this manner, a sample paper product 94, FIGURE 7, having a pair of opposed ends 95 and 96 can be clamped between sets of jaws 93, 92 and 46, 47, the product 94 being so dimensioned that the same is slack between the respective jaws in the manner illustrated in FIGURE 5. Product 94 is adapted to be alternately folded at a perforated or non-perforated line 97 thereof when air flows through chamber 37 in substantially the same manner as product 86 previously described.

When product 94 fails and separates at line 97 thereof, the light from light source 52 reaches photorelay 32 and stops timer 55.

Since jaws 46, 47 or jaws 46, 47 and 92, 93 merely hold the respective paper product 86 and 94 and do not fold the same in the manner of prior known devices, and since the volume of air travelling through the compartment 87 is constant, the base weight of the product controls the tension thereof. For example, since the size of the samples to be tested is kept constant and the mass of the vibrating sample provides the tension on the same, paper of greater base weight will be folded under more tension than the tension of paper of lesser base weight.

It is to be understood that the numerical test strength data obtained in accord with this invention are relative numbers which are based on standard paper products which have been evaluated and found to have satisfactory dynamic, tensile and fold characteristics as recognized by persons skilled in the papermaking art.

Therefore, it can be seen that there has been provided an improved method and apparatus for testing the dynamic, tensile and fold strength of paper products and the like which is accurate and dependable.

While the foregoing presents preferred embodiments of the present invention, it is obvious that other modifications and/or improvements may be employed without departing from the scope of the invention, which is defined in the appended claims.

What is claimed is:

1. A method for testing the fold strength of a paper product comprising the steps of rendering said paper product foldable along a selected line by weakening the same against bending about said line by deformation of said paper product along said line, suspending said paper product in a fluid stream travelling transversely to said line whereby said fluid stream causes said paper product to alternately fold at said line, and measuring the time it takes said fluid stream to break said paper product at said line.

2. A method as set forth in claim 1 wherein said paper product is rendered foldable along said line by perforating the same along said line.

3. A method as set forth in claim 1 wherein said fluid stream is air.

4. A method as set forth in claim 1 wherein said paper product is a piece of paper.

5. A method for testing the fold strength of a paper product comprising the steps of rendering said paper product foldable along a selected line transverse to the opposed ends thereof by weakening the same against bending about said line by deformation of said paper product along said line, suspending said paper product in a fluid stream travelling transversely to said line whereby said fluid stream causes said paper product to alternately fold at said line, said paper product being suspended only at the end thereof that is first engaged by said fluid stream, and measuring the time it takes said fluid stream to break said paper product at said line.

6. A method for testing the fold strength of a paper product comprising the steps of rendering said paper product foldable along a selected line transverse to the opposed ends thereof by weakening the same against bending about said line by deformation of said paper product along said line, suspending said paper product between two holding means respectively holding said ends thereof, said paper product being slack between said holding means, causing a fluid stream to flow transversely across said line in a particular direction whereby said fluid stream causes said paper product to alternately fold at said line, and measuring the time it takes said fluid stream to break said paper at said line.

7. An apparatus for testing the fold strength of a paper product mechanically weakened along a selected line against bending comprising a housing having a chamber provided with an inlet and an outlet, holding means in said chamber for holding a paper product in said chamber, means interconnected to said inlet of said chamber for causing fluid to travel through said chamber to said outlet and cause said paper product to alternately fold along said selected line thereof disposed transversely to the direction of travel of said fluid, and timing means including a light source and a light-sensitive device on opposite sides of said paper product for measuring the time required for said stream to break said paper product.

8. An apparatus as set forth in claim 7 wherein said second-named means comprises an air blower.

9. An apparatus as set forth in claim 7 wherein said holding means comprises at least one set of spring loaded jaws for clamping an end of said paper product therebetween.

10. An apparatus for testing the strength of a paper product mechanically weakened along a selected line against bending comprising a housing having a chamber provided with an inlet and an outlet, holding means in said chamber for holding a paper product in said chamber, means interconnected to said inlet of said chamber for causing fluid to travel through said chamber to said outlet and cause said paper product to alternately fold along said selected line thereof disposed transversely to the direction of travel of said fluid, and means to measure the time that said fluid takes to break said paper product at said line.

11. An apparatus as set forth in claim 10 wherein said last-named means includes a light source located on one side of said chamber and a light sensing means disposed on the other side of said chamber, said light source and light sensing means being so arranged that said paper product prevents said light from reaching said sensing means until said product breaks at said line, a timer interconnected with said sensing means and being adapted to be stopped when said light reaches said sensing means.

12. An apparatus comprising a housing having an upwardly directed chamber provided with an inlet at the lower end thereof and an outlet at the upper end thereof, said chamber decreasing asymmetrically in cross-sectional area from said inlet to said outlet, holding means disposed in said chamber for holding a paper product in said chamber, an air blower interconnected to said inlet of said chamber for causing air to travel through said chamber to said outlet and cause said paper product to alternately fold along a selected line thereof disposed transversely to the direction of travel of said fluid and mechanically weakened against bending, and means to measure the time that said fluid takes to break said paper product at said line.

13. In combination, a housing having a chamber provided with an inlet and an outlet, holding means disposed in said chamber for holding a paper product having a pair of opposed edges and being foldable along a line transverse thereto intermediate said edges, said product having at least one of said edges thereof carried by said holding means, means interconnected to said inlet of said chamber for causing fluid to travel through said chamber to said outlet and transversely to said line and cause said paper product to alternately fold along said line, and means to measure the time that said fluid takes to break said paper product at said line.

14. A combination as set forth in claim 13 wherein said holding means includes two spaced pairs of jaws and said paper product is held by said pairs of jaws, said pairs of jaws being so spaced that said paper product is disposed therebetween with sufficient slack therein that said paper product is free to vibrate while simultaneously folding along said transverse line.

References Cited in the file of this patent
UNITED STATES PATENTS

| | | |
|---|---|---|
| 2,625,659 | Mendelson | Jan. 13, 1953 |
| 2,677,274 | Puckett | May 4, 1954 |
| 2,825,223 | Conti | Mar. 4, 1958 |

FOREIGN PATENTS

| | | |
|---|---|---|
| 650,511 | Germany | Sept. 25, 1937 |